Patented Jan. 15, 1935

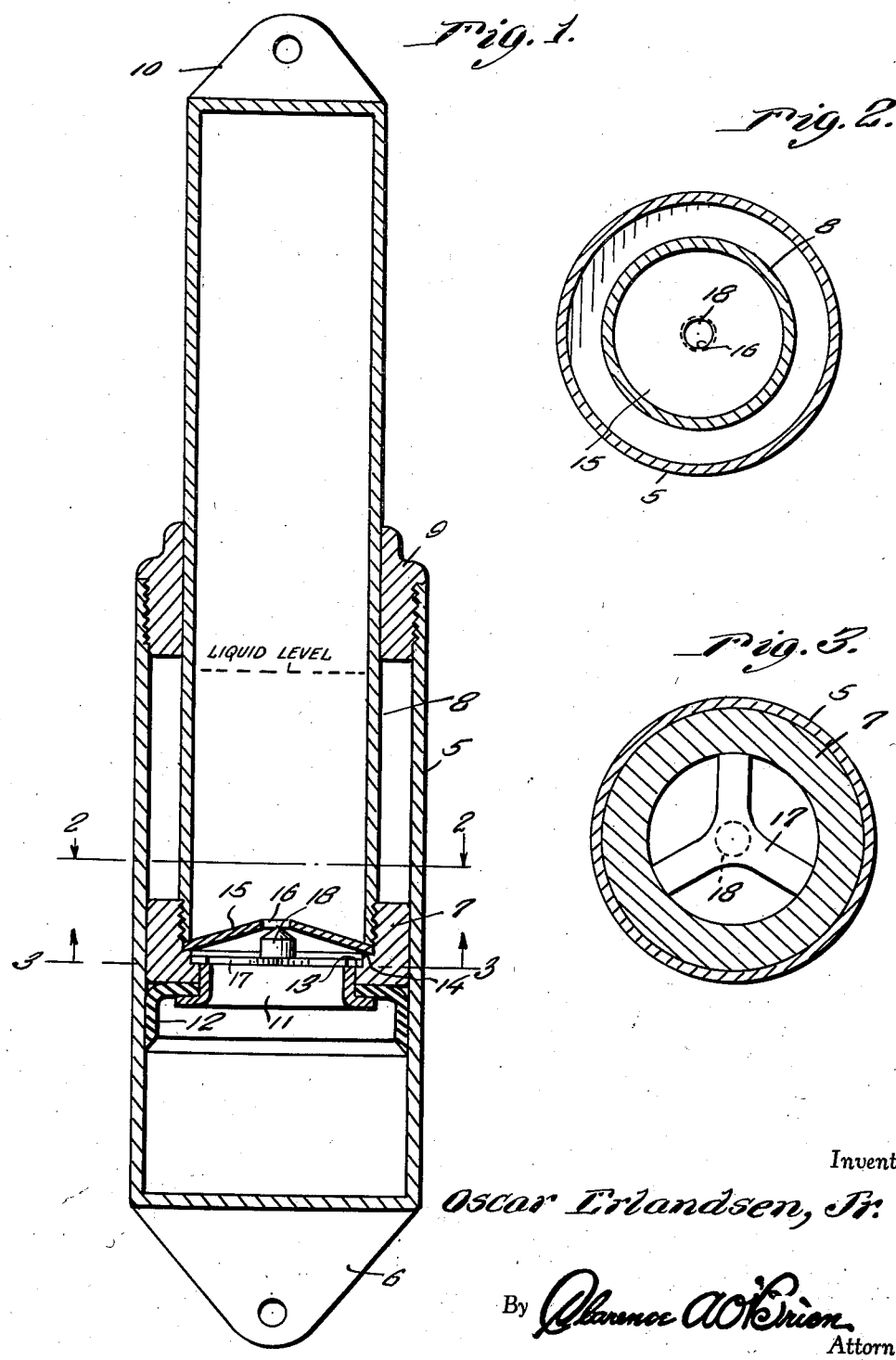

1,988,194

UNITED STATES PATENT OFFICE 1,988,194

SHOCK ABSORBER

Oscar Erlandsen, Jr., Hempstead, N. Y.

Application October 13, 1933, Serial No. 693,491

2 Claims. (Cl. 188—88)

This invention relates to certain new and useful improvements in shock absorbers, and has as its object the provision of an improved shock absorber for use on vehicles, and particularly on aeroplanes and automobiles.

More particularly, it is an object of the invention to provide an improved valve structure as a part of such a shock absorbing mechanism.

The invention will be understood from a study of the following description taken in connection with the accompanying drawing, wherein:—

Figure 1 is a sectional view through the shock absorber, and

Figures 2 and 3 are sectional views taken substantially on the lines 2—2 and 3—3 respectively of Figure 1.

Referring to the drawing by reference numerals, it will be seen that the shock absorber comprises a cylinder 5 which, at its closed end, is provided with an extension 6 suitably apertured for accommodating a pivot bolt or the like whereby said end of the cylinder is secured, as for example, when the device is used on an aeroplane, to the wheel axle of the running gear of the aeroplane. The cylinder 5 is adapted to contain oil or other fluid which is displaceable through the medium of a piston 7 that is mounted in the cylinder for reciprocation. The piston 7 is provided on one end of a tubular rod 8 that is slidable through an apertured plug 9 threaded in the upper open end of the cylinder 5. At its upper or free end, the rod 8 is closed and is provided with an integral web 10 that is suitably apertured for accommodating a pivot bolt or the like whereby said end of the piston rod, when the device, as before mentioned, is used on an aeroplane, may be pivotally connected with the fuselage.

The piston 7 has a central opening therethrough aligning with the bore of the rod 8 which is open at that end thereof to which the piston 7 is secured. The piston 7 comprises a body threaded on the end of the rod, and to the under side of the body is secured, through the medium of a suitable coupling means 11 a washer 12 of leather or other suitable material.

The body of the piston 7, at the inner end of the coupling means 11, is formed to provide a circular seat 13, and above the seat 13 a circular shoulder 14.

A flexible diaphragm disk or washer, now generally known to the art as a "Bellville spring" and designated by the reference numeral 15, has its marginal edge clamped between the shoulder 14 and the threaded end of the rod 8, as shown in Figure 1. The flexible washer 15 is substantially conical and is provided at its apex with an aperture or port 16.

The washer 15 forms one part of a valve, the other or complemental part of which comprises a relatively rigid spider 17 that normally rests on the seat 13 and has a limited free movement with respect to the seat 13. At the center thereof, the spider 17 is provided with an upstanding valve pin 18 that is adapted to engage in the aperture 16 of the washer 15 for controlling communication between the cylinder 5 and the rod 8, it being understood that the allowed maximum movement of spider 17 is such that valve 18 carried thereby can never completely close port 16 of disk 15.

From the above, it will be apparent that when the shock absorbing device is mounted on a vehicle, as for example, on an aeroplane in the manner above suggested, and the wheel of the vehicle strikes a bump and begins to rise with respect to the body or fuselage of the vehicle, the shock absorbing device is compressed as the wheel rises. In other words, as the wheel of the vehicle rises with respect to the body or fuselage, the cylinder 5 moves upwardly with respect to the piston 7 and its rod 8 so that the fluid in the cylinder 5 below the piston 7 is compressed and is displaced upwardly through the orifice 16 in the disk 15. To make the fluid flow upwardly, it follows that there must be greater pressure on the under side of the disk 15 than on the spider 17. As the liquid pressure on the disk 15 is increased, the disk 15 will be flexed upwardly for moving the apex portion thereof farther away from the needle 18, the fluid pressure on the spider being such as to lift the latter so as to place valve 18 in close (but not touching) proximity to the disk 15, thereby permitting more liquid to flow through, which in turn will relieve the pressure on the disk 15. When the wheel of the vehicle is lowering with respect to the fuselage, there will be greater pressure on the upper side of the disk 15 and the pressure of the fluid will have a tendency to move the spider 17 with the needle valve 18 downwardly into engagement with the seat 13 so as not to restrict the passage of fluid through the orifice 16, with the result that a rapid rebound will be permitted.

From the above, it will be apparent that when a vehicle is equipped with a shock absorbing device embodying the features of the present invention, it will approach perfect riding qualities, because the tendency to jolt the body of the vehicle greatly increases the effective orifice size, reference being had to the orifice 16, thereby tending to keep the force exerted by the device a practical constant.

What is claimed as new is:—

1. In a shock absorbing device of the character described, a cylinder adapted to contain fluid, a piston mounted for reciprocation within said cylinder, a hollow rod having an open end secured to said piston, said piston having an opening therethrough registering with the open end of said rod, and valve means arranged within the opening in said piston including a fixed pressure responsive disk having a central orifice, a floating member at the under side of said disk, and a needle valve on said floating member for controlling said orifice.

2. A shock absorber comprising a cylinder, a piston mounted for reciprocation within said cylinder, a hollow rod for said piston having an open end connected with the piston, a flexible disk fixedly mounted at the open end of the rod and provided with a central orifice, a shoulder provided at the under side of said disk, a floating spider normally engaging said shoulder, and a needle valve integral with the spider for controlling the passage of fluid through said orifice in the disk, in accordance with the pressure developed upon relative movement between the cylinder and piston.

OSCAR ERLANDSEN, Jr.